United States Patent [19]
Kuga

[11] Patent Number: 5,479,225
[45] Date of Patent: Dec. 26, 1995

[54] AUTOMATIC FOCUSING PROJECTOR

[75] Inventor: Kaeko Kuga, Kyoto, Japan

[73] Assignee: Rohm Co., Ltd., Kyoto, Japan

[21] Appl. No.: 408,565

[22] Filed: Mar. 22, 1995

[30]     Foreign Application Priority Data

Mar. 23, 1994   [JP]   Japan ................... 6-051521

[51] Int. Cl.$^6$ .................................................. G03B 21/14
[52] U.S. Cl. ............................................ 353/101; 353/81
[58] Field of Search .................... 353/101, 122,
                                353/81; 359/40; 348/792

[56]             References Cited

U.S. PATENT DOCUMENTS 5,114,223   5/1992   Torigoe et al. ...................... 353/101
5,276,523   1/1994   Kurematsu et al. ................. 353/101

*Primary Examiner*—William C. Dowling
*Attorney, Agent, or Firm*—Nikaido, Marmelstein, Murray & Oram

[57]              ABSTRACT

A projector is provided which is capable of performing projection and automatic focusing with one optical system and of being set in an arbitrary direction relative to the screen. The projector is provided with a projector lens, a liquid crystal panel, a light emitting device, a light receiving device, two prisms which direct a light beam from the liquid crystal panel and a light beam from the light emitting device to the projector lens and scan the light beams in two directions vertical to the optical axis of the projector lens. The image light beam from the liquid crystal panel and the light beam from the light emitting device are projected onto the screen through the projector lens. The light beam from the light emitting device reflected by the screen is received through the projector lens and the prisms. A position controller moves the projector lens forward and backward while scanning the light beam from the light emitting device by the prisms. When in-focus condition is obtained with respect to a scanning position on the screen, the position controller displays a pixel of the liquid crystal panel corresponding to the position.

9 Claims, 6 Drawing Sheets

AUTOMATIC FOCUSING PROJECTOR

BACKGROUND OF THE INVENTION

1. Field of the Invention

The present invention relates to a projector which projects an image.

2. Description of the Prior Art

Figure 1:
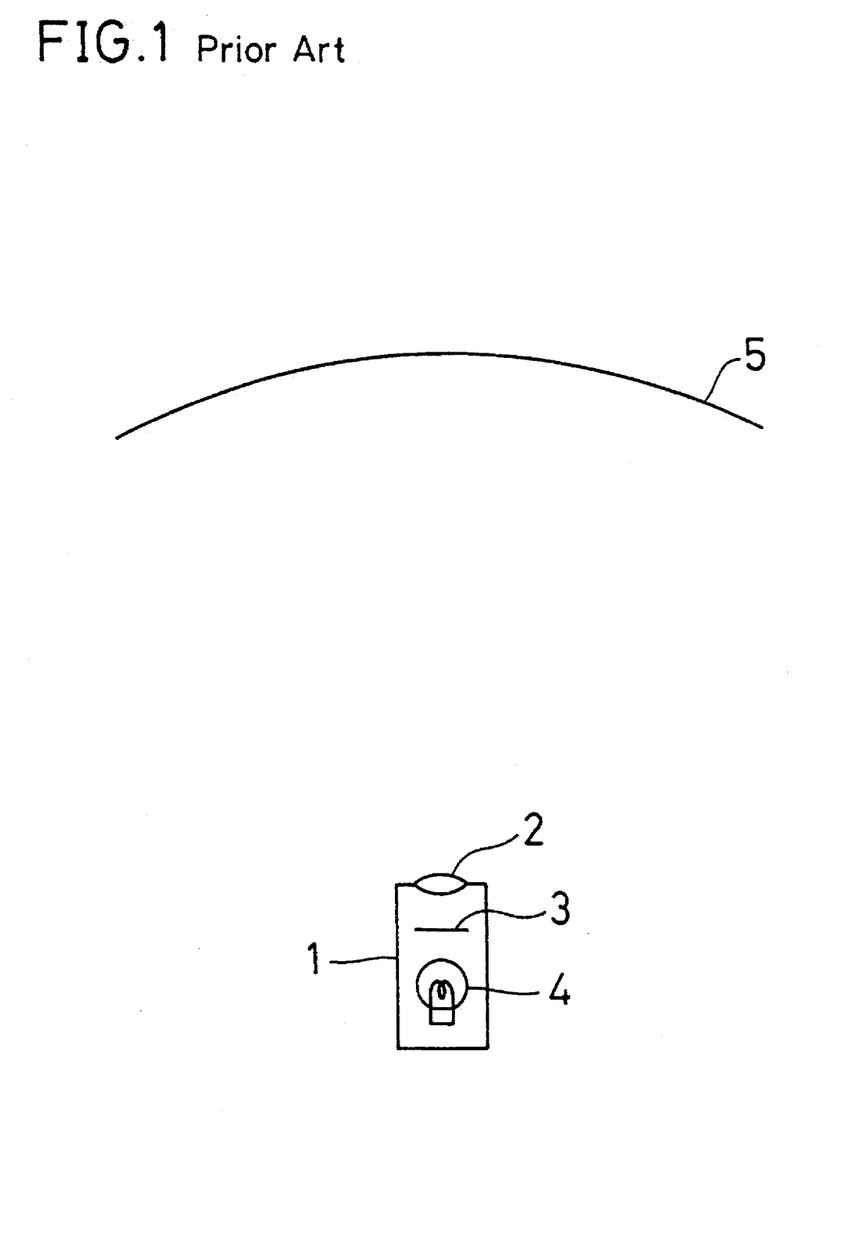
FIG. 1 schematically shows the arrangement of a conventional projector.

Conventionally, a projector is arranged opposite to a screen, and focusing is performed manually or automatically. Referring to FIG. 1, there is schematically shown the arrangement of a conventional projector. Reference numeral 1 represents a projector. Reference numeral 2 represents a projector lens. Reference numeral 3 represents image information such as film. Reference numeral 4 represents a back light source. Reference numeral 5 represents a screen. To view an image, focusing of the projector lens 2 is manually or automatically performed according to the distance between the screen 5 and the projector 1.

Figure 2A:
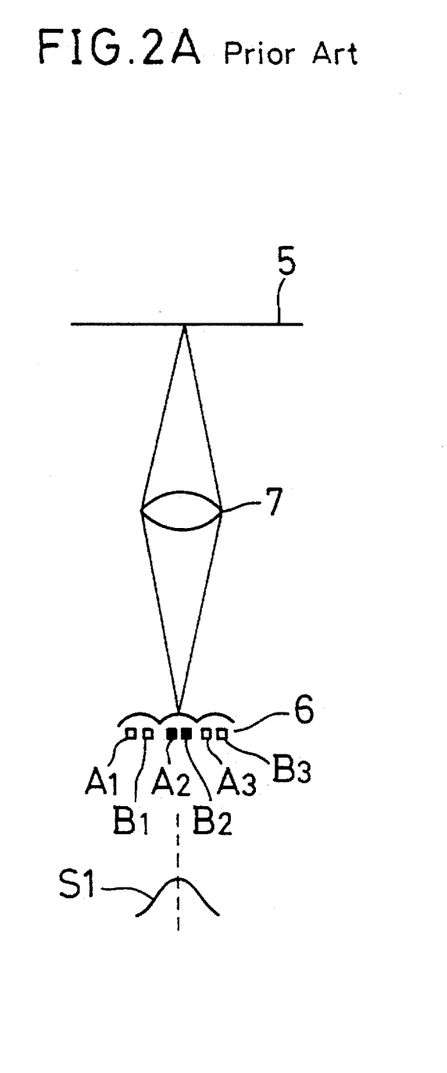
FIG. 2A shows a condition where in-focus condition is obtained in a conventional focus detecting method.
Figure 2B:
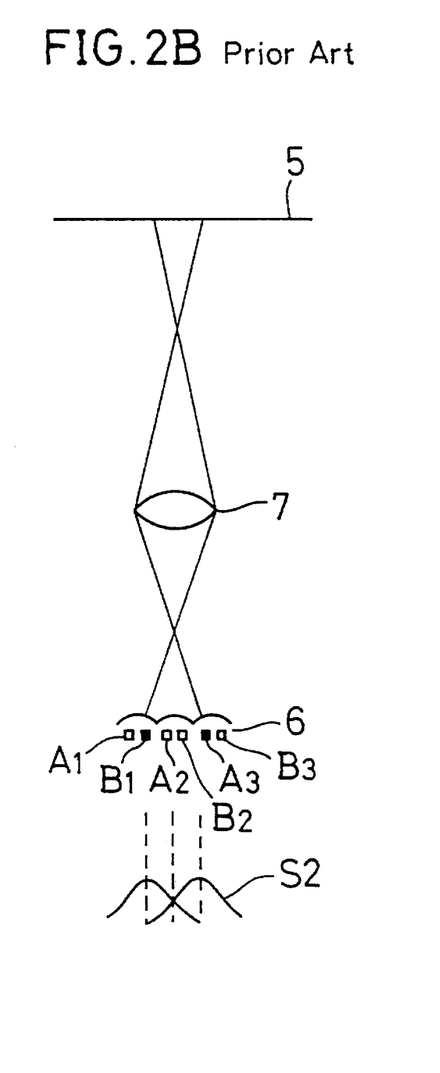
FIG. 2B shows a condition where in-focus condition is not obtained in the conventional focus detecting method.

Subsequently, a conventional automatic focusing method will be described. FIGS. 2A and 2B show the principle of the method. This automatic focusing method is according to a so-called TCL phase detecting method. Reference numeral 6 represents a light receiving device such as a line sensor. Reference numeral 7 represents a focus detecting lens provided separately from the projector lens 2. Reference numeral 5 represents a screen. $A_1$ to $A_3$ represent A line chips of the light receiving device 6. $B_1$ to $B_3$ represent B line chips of the light receiving device 6. They are paired such as $A_1$ and $B_1$, and $A_2$ and $B_2$. Light beams having passed at the left and right sides of the lens 7 are incident on an A line chip and a B line chip, respectively.

In in-focus condition as shown in FIG. 2A, the light beams having passed at the left and right sides of the lens 7 are formed into images on the central pair of the chips $A_2$, $B_2$, and the output is as shown at S1. In out-of-focus condition as shown in FIG. 2B, the light beams having passed at the left and right sides of the lens 7 are formed into images on chips such as $A_3$ and $B_1$ located away from each other, and the output is as shown at S2. Therefore, in-focus condition is automatically obtained by adjusting the lens 7 so that the output of the light receiving device 6 is as shown at S1.

According to the conventional method, however, it is necessary for the projector 1 to be arranged opposite to the screen 5. In addition, at least two independent optical systems (a projector optical system and a focus detecting optical system) are necessary to perform automatic focusing, so that the price of the apparatus increases.

SUMMARY OF THE INVENTION

An object of the present invention is to provide a projector capable of performing projection and automatic focusing with one optical system and of being set in an arbitrary direction relative to the screen.

To achieve the above-mentioned object, according to the present invention, a projector is provided with a projector lens, a display for displaying an image, a light emitting device and a light receiving device for focus detection, an optical system which directs a light beam from the display and a light beam from the light emitting device to the projector lens and which scans the light beams in two directions vertical to the optical axis of the projector lens, and controlling means; and the image light beam and the light beam from the light emitting device are projected onto the screen through the projector lens. The light receiving device receives through the optical system the light beam from the light emitting device reflected by the screen. The controlling means moves the projector lens forward and backward while scanning the light beams from the light emitting device by the optical system. When in-focus condition is obtained with respect to a scanning position on the screen, the controlling means displays a pixel of the display corresponding to the position.

According to the above features, focusing is performed for each scanning position on the screen and an image corresponding to the position is projected when in-focus condition is obtained, so that a clear image is projected onto the entire screen even if the projector is arranged obliquely to the screen.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 3:
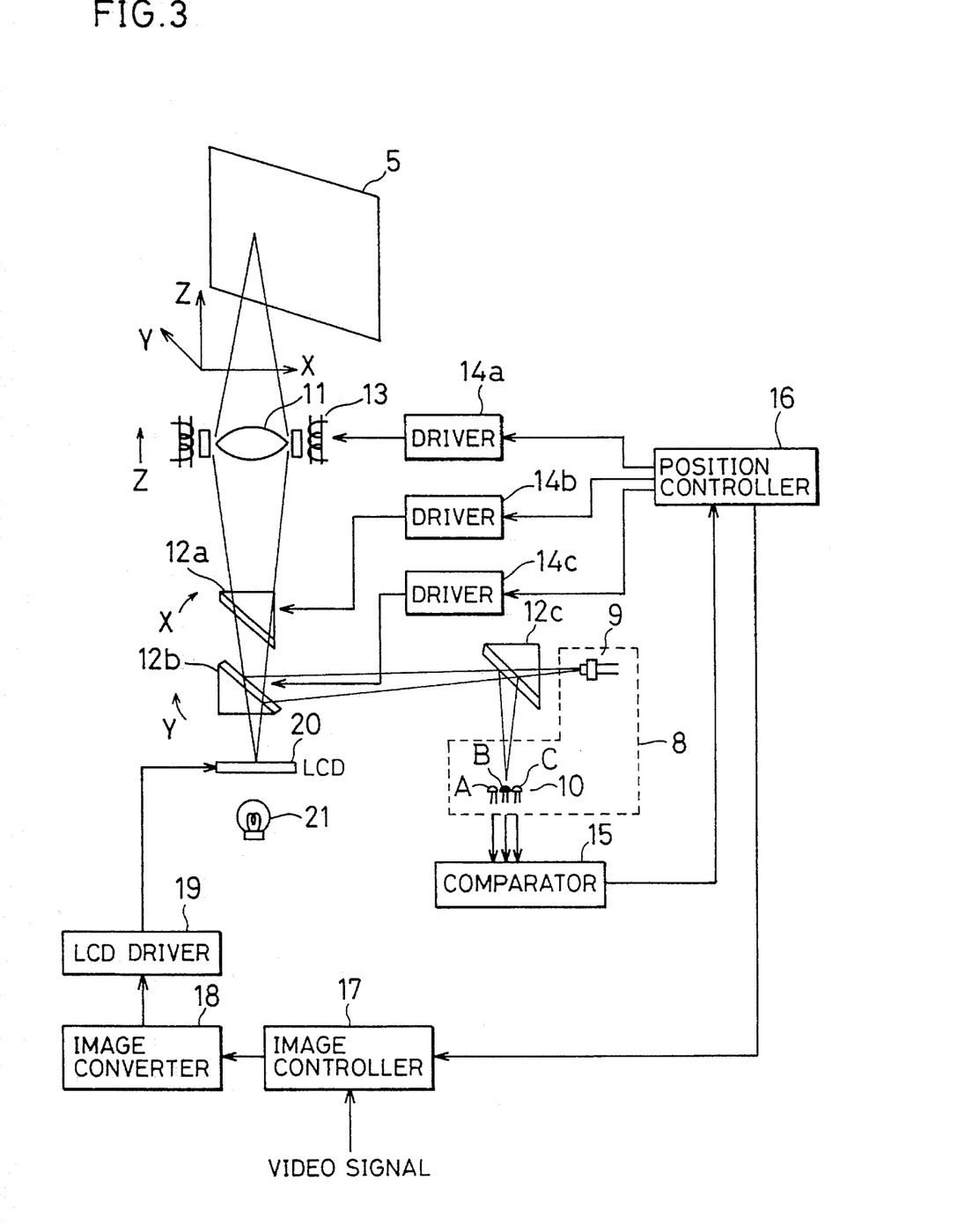
FIG. 3 schematically shows the arrangement of a first embodiment of an automatic focusing projector of the present invention.

Automatic focusing projectors of the present invention will be described with reference to the drawings. Referring to FIG. 3, there is schematically shown the arrangement of a first embodiment of a projector of the present invention. Reference numeral 8 represents a focus detector including a light emitting device 9 such as a light emitting diode (LED) and a light receiving device 10 such as a photodiode array. The light emitting device 9 emits light beams in the invisible range (i.e. invisible light beams). A, B and C represent photodiodes of the light receiving device 10. Reference numeral 11 represents a projector lens, and 12*a*, 12*b* and 12*c* represent prisms. The prism 12a rotates horizontally (i.e. in the X direction). The prism 12b rotates vertically (i.e. in the Y direction). The prism 12c separates incident and exit light beams.

Reference numeral 13 represents a moving magnet type driver which linearly moves the projector lens 11 in the Z direction, and 14a represents a driver for the driver 13, 14b represents a driver for horizontally rotating the prism 12a, and 14c is a driver for vertically rotating the prism 12b. Reference numeral 15 represents a comparator which outputs a high level signal or a low level signal according to the output of the light receiving device 10. Reference numeral 16 represents a position controller which controls the drivers 14a, 14b and 14c. Reference numeral 17 represents an image controller which controls a video signal. Reference numeral 18 represents an image converter. Reference numeral 19 represents a driver for driving a liquid crystal panel 20. Reference numeral 21 represents a back light source. Reference numeral 5 represents a screen. The X, Y and Z axes represent vector axes in the three-dimensional space.

Subsequently, the operation will be described. An invisible light beam emitted from the light emitting device 9 of the focus detector 8 is irradiated from the projector lens 11 to the screen 5 through the prism 12c, the prism 12b and the prism 12a. The position controller 16 supplies a Z direction drive signal to the lens driver 13 through the driver 14a. By the Z direction drive signal, the lens 11 is moved forward and backward to perform focusing.

The position controller 16 supplies an X direction drive signal according to a predetermined scanning signal to the prism 12a through the driver 14b to rotate the prism 12a horizontally, so that the light beams are scanned in the X direction. The position controller 16 supplies a Y direction drive signal according to a predetermined scanning signal to the prism 12b through the driver 14c to rotate the prism 12b vertically. Thereby, the light beam from the light emitting device 9 is scanned in the Y direction. The light beam emitted from the projector lens 11 is reflected by the screen 5 and the reflected light beam is incident on the light receiving device 10 through the projector lens 11, the prism 12a, the prism 12b and the prism 12c.

The image controller 17 displays an image on the liquid crystal panel 20 through the image converter 18 and the driver 19. This image is projected onto the screen 5 through the prisms 12b and 12a and the projector lens 11 by the visible light beam from the back light source 21. The scanning of the liquid crystal panel 20 by the image controller 17 is in synchronism with the driving of the projector lens 11 and the prisms 12a and 12b by the position controller 16, and in-focus condition is obtained for every pixel levels of the liquid crystal panel 20.

Figure 4A:
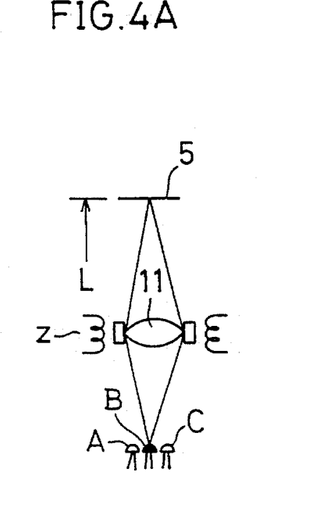
FIG. 4A shows a condition where the automatic focusing projector is in focus.
Figure 4B:
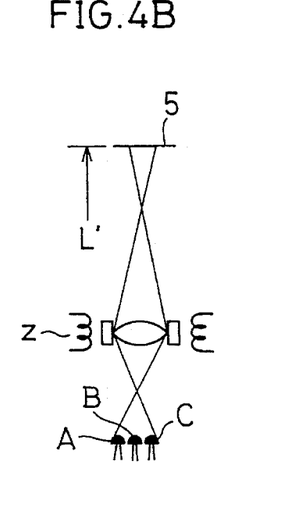
FIG. 4B shows a condition where the automatic focusing projector is out of focus.
Figure 4C:
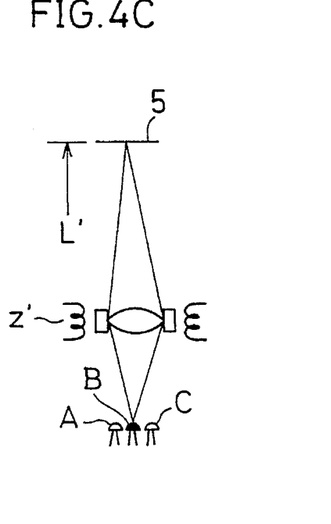
FIG. 4C shows a condition where the automatic focusing projector is again in focus.

FIGS. 4A to 4C show the principle of the automatic focusing method. FIG. 4A shows a condition where in-focus condition is obtained with respect to the screen 5. The screen 5 is located at a distance L and the projector lens 11 is at a position z. The invisible light beam which is reflected by the screen 5 is incident on the central photodiode B of the light receiving device 10. At this time, of the photodiodes A, B and C, only the photodiode B produces an output. In FIG. 4B, the screen 5 is located at a distance L' which is longer than the distance L of FIG. 4A while the lens 11 is still at the position z. In this case, in-focus condition is not obtained, and the invisible light which is reflected by the screen 5 is incident on the photodiodes A and C of the light receiving device 10 in addition to the photodiode B, so that all of the photodiodes A, B and C produce outputs. FIG. 4C shows a condition where the projector lens 11 is moved to a position z' from the condition of FIG. 4B so that in-focus condition is again obtained with respect to the screen 5. In this case, the reflected light is incident only on the central photodiode B, so that only the photodiode B produces an output.

The comparator 15 outputs a high level signal when it receives a signal only from the central photodiode B and outputs a low level signal when its receives a signal also from the left and right photodiodes A and B besides from the photodiode B. Therefore, when a high level signal is outputted from the comparator 15, in-focus condition is obtained. The position controller 16 drives the projector lens 11 through the driver 14a in the Z direction until a high level signal is outputted from the comparator 15. Thereby, focusing can be automatically performed.

Figure 5A:
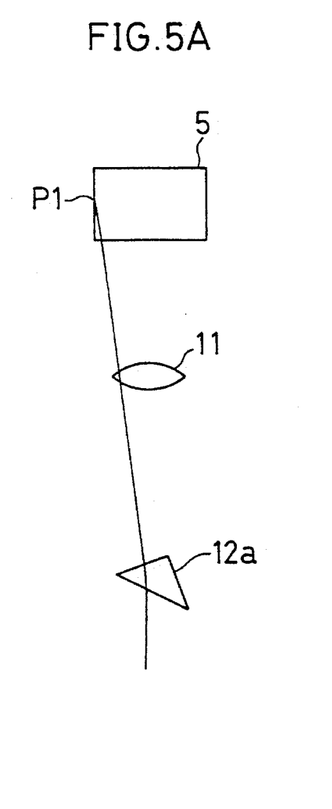
FIG. 5A shows a condition where a horizontal scanning of the automatic focusing projector is started.
Figure 5B:
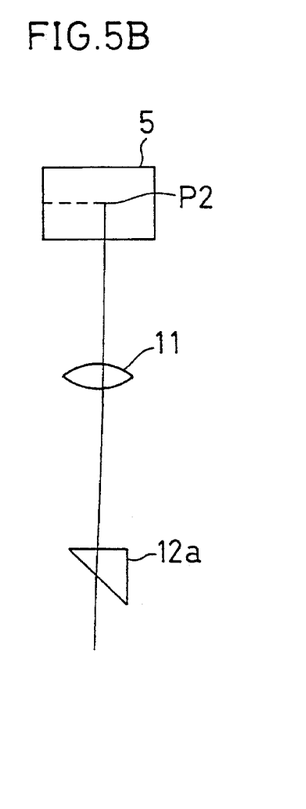
FIG. 5B shows a condition where the horizontal scanning of the automatic focusing projector is being started.
Figure 5C:
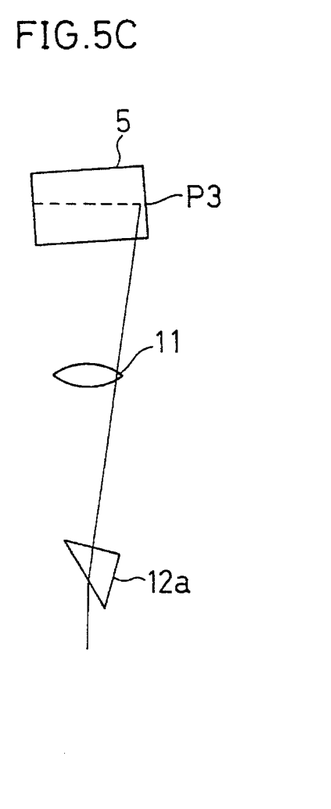
FIG. 5C shows a condition where the horizontal scanning of the automatic focusing projector is finished.

Subsequently, the method of scannings in the X and Y directions will be described. FIGS. 5A to 5C show a manner of the scanning in the X direction. When the prism 12a is in the condition of FIG. 5A, the invisible light beam from the light receiving device 9 is refracted by the prism 12a, passes at the left side of the projector lens 11, and is irradiated to a position P1 on the screen 5. The projector lens 11 is moved forward or backward by the driver 14a under this condition to perform focusing. By rotating the prism 12a in the X direction from this position, the invisible light beam moves by way of a position P2 of FIG. 5B to a position P3 of FIG. 5C. At each scanning position between the positions P1 and P3, the projector lens 11 is driven to perform focusing. Thereby, the scanning in the X direction is performed and focusing is performed.

Although not shown, the scanning in the Y direction is performed by rotating the prism 12b in a similar manner. In the scanning in the Y direction, focusing is performed by driving the projector lens 11 forward and backward at each scanning position.

The back light from the light source 21 for projecting an image on the liquid crystal panel 20 is scanned on the screen 5 by the rotations of the prisms 12a and 12b after passing through the liquid crystal panel 20. The position controller 16 calculates the scanning position based on the directions of the prisms 12a and 12b and supplies the position to the image controller 17 when a high level signal is received from the comparator 15. The image controller 17 supplies to the image converter 18 a video signal corresponding to the supplied position. Thereby, the display of a pixel of the liquid crystal panel 20 corresponding to the scanning position is performed.

Thus, the display of the liquid crystal panel 20 for every pixel is in synchronism with the scanning by the prisms 12a and 12b, so that in combination with the focusing by the driving of the projector lens 11, an image which is always in focus is displayed on the screen 5.

Figure 6:
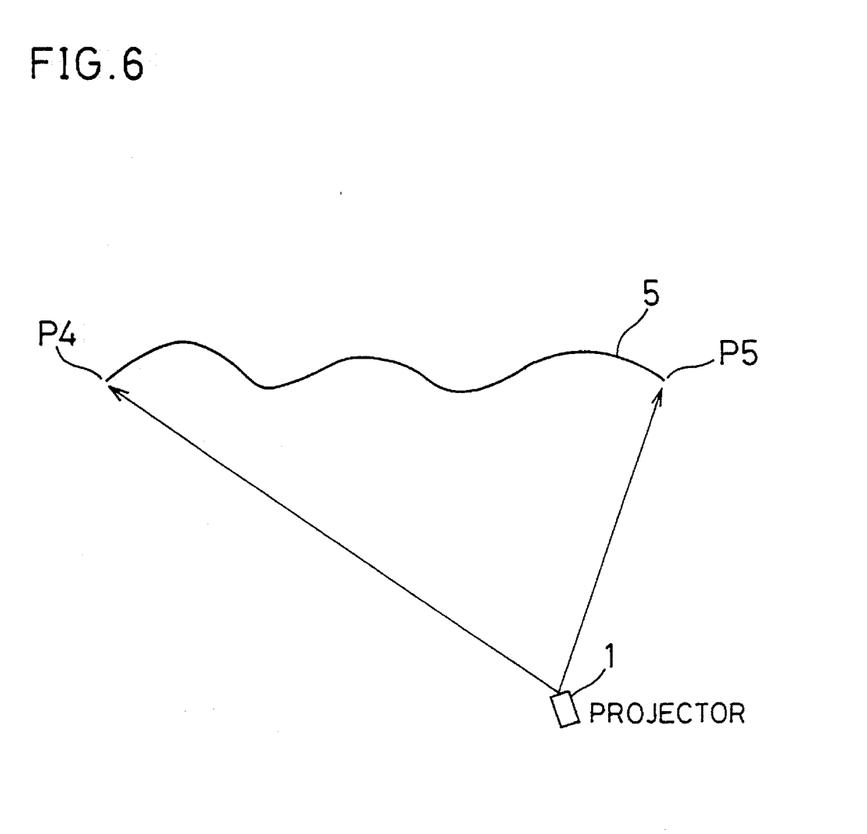
FIG. 6 shows a manner in which the automatic focusing projector of the present invention arranged obliquely to a screen having an uneven surface is projecting an image onto the screen.

FIG. 6 shows a condition where the projector 1 of the present invention is arranged obliquely to the screen 5 having an uneven surface. Since the projector 1 is focused successively on positions between the positions P4 to P5 on the screen 5 for every pixel levels, even when the projector 1 is arranged obliquely to such an uneven screen, in-focus projection can always be performed, so that a clear image can always be viewed.

While an arrangement where the scannings in the X and Y directions are performed by the prism 12a and the prism 12b, respectively, is shown, the rotation directions of the prisms 12a and 12b may be replaced with each other so that the scanning in the Y direction is performed by the prism 12a and that the scanning in the X direction is performed by the prism 12b. Further, the scannings of the both directions may be performed by one prism which rotates in the X and Y directions.

Figure 7:
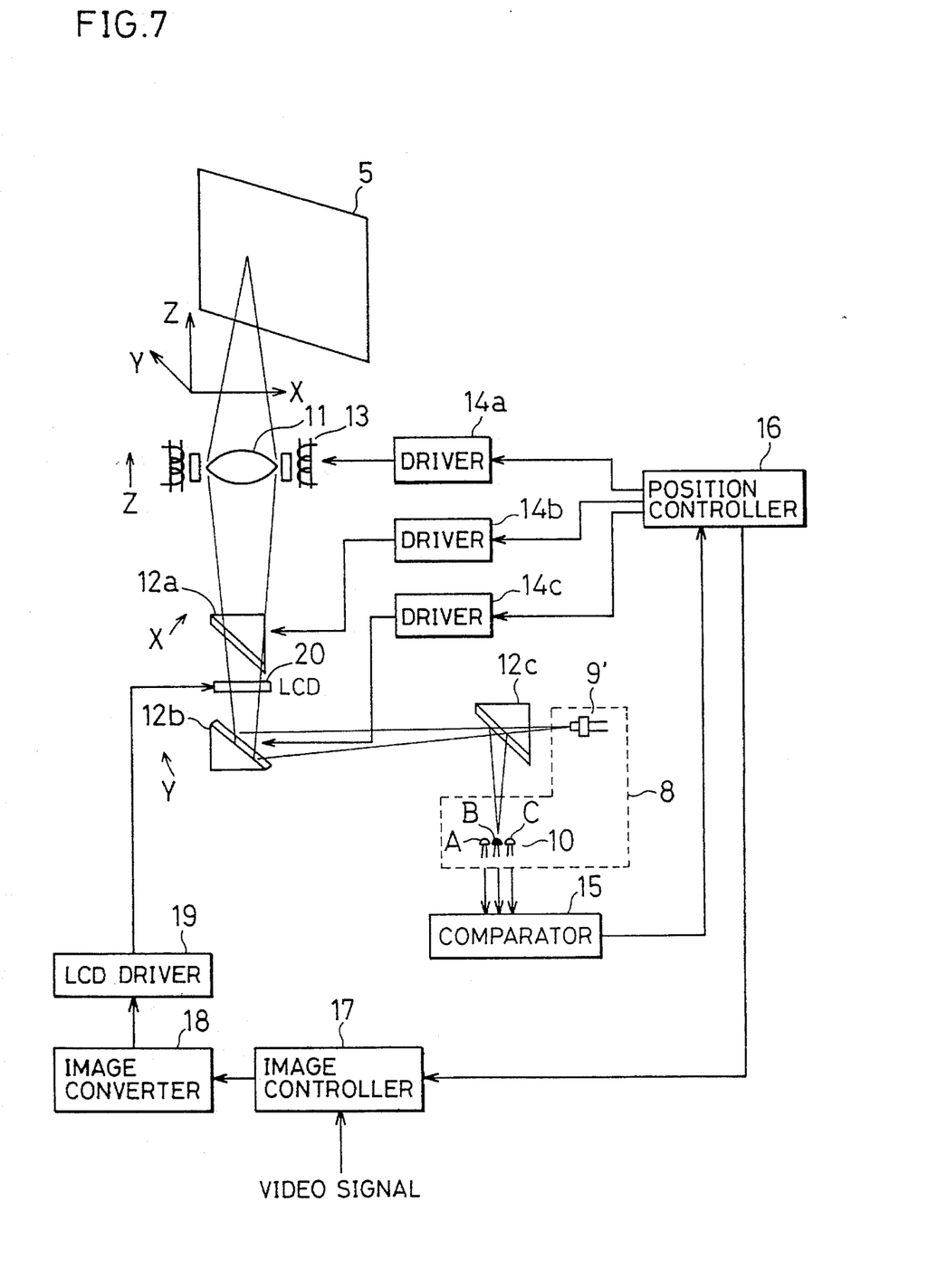
FIG. 7 schematically shows the arrangement of a second embodiment of an automatic focusing projector of the present invention.

Referring to FIG. 7, there is schematically shown the arrangement of a second embodiment of an automatic focusing projector of the present invention. While the light emitting device 9 for focus detection and the light source 21 for projection are separately provided in the first embodiment, in this embodiment, an output light beam of a light emitting device 9' is used also as back light for projection. In this case, the positions of the liquid crystal panel 20 and the prism 12b shown in FIG. 1 are replaced with each other. Further, as the light emitting diode 9', a device such as a laser diode which emits visible light is used. The other portions are the same as those of the first embodiment.

In this embodiment, the display for each pixel, the scanning and the focusing are performed in synchronism as well, so that a sharp image is projected onto the entire screen irrespective of the setting direction of the projector relative to the screen and the unevenness of the surface of the screen.

Obviously, many modifications and variations of the present invention are possible in light of the above teachings. It is therefore to be understood that within the scope of the appended claims, the invention may be practiced other than as specifically described.

What is claimed is:

1. A projector which projects an image onto a screen, comprising:
    a projector lens which is movable along an optical axis;
    a lens driving circuit which drives the projector lens along the optical axis;
    display means for displaying the image, said display means including a plurality of pixels;
    a display circuit which is supplied with a signal representative of a position to perform a display of a pixel of the display means, said pixel being located at a position corresponding to the signal;
    a light emitting device;
    an optical system which causes a light beam from the display means and a light beam from the light emitting device to pass through the projector lens to be projected onto the screen, said optical system scanning the light beams in two directions vertical to the optical axis of the projector lens;
    a light receiving device which receives the light beam from the light emitting device which is reflected by the screen through the projector lens and the optical system to output a signal;
    focus detecting means for outputting an in-focus signal based on an output signal of the light receiving device; and
    controlling means for driving the projector lens by the lens driving circuit while performing the scanning by the optical system, said controlling means being supplied with an output of the focus detecting means to supply to the display circuit a signal representative of a scanning position of the optical system when the in-focus signal is received from the focus detecting means.

2. A projector according to claim 1, wherein said optical system comprising:
    a first optical device which scans the light beam from the display means and the light beam from the light emitting device in a first direction vertical to the optical axis of the projector lens; and
    a second optical device which scans the light beam from the display means and the light beams from the light emitting device in a second direction vertical to the optical axis of the projector lens and vertical to the first direction.

3. A projector according to claim 2, wherein said first optical device receives the light beam from the display means and the light beam from the light emitting device to direct the light beams to the second optical device, and wherein said second optical device directs the light beams from the first optical device to the projector lens.

4. A projector according to claim 1, wherein said light receiving device includes a plurality of photoelectric conversion devices arranged in an array, and wherein said focus detecting means outputs the in-focus signal when only a predetermined photoelectric conversion device of the light receiving device outputs a signal.

5. A projector according to claim 1, wherein said display means is a liquid crystal display.

6. A projector according to claim 5, wherein said liquid crystal display includes a display panel and a back light source, and wherein a light beam from the back light source having passed through the display panel is projected onto the screen through the optical system and the projector lens.

7. A projector according to claim 1, wherein said light beam emitted by the light emitting device is a light beam outside a visible range.

8. A projector which projects an image onto a screen, comprising:
    a projector lens which is movable along an optical axis;
    a lens driving circuit which drives the projector lens along the optical axis;
    a liquid crystal panel for displaying the image;
    a display circuit which is supplied with a signal representative of a position to perform a display of a pixel of the display means, said pixel being located at a position corresponding to the signal;
    a light emitting device;
    a first prism which receives a light beam from the liquid crystal panel and a light beam from the light emitting device so that the light beams exit in the same direction, said first prism being rotatably arranged so as to scan the exiting light beams in a first direction vertical to the optical axis of the projector lens;
    a second prism arranged on the optical axis of the projector lens, said second prism receiving the light beams exiting from the first prism so that the light beam exits toward the projector lens and being rotatably arranged to scan the exiting light beam in a second direction vertical to the optical axis of the projector lens and vertical to the first direction;
    a first prism driving circuit which drives a rotation of the first prism;
    a second prism driving circuit which drives a rotation of the second prism;
    a light receiving device including a plurality of photoelectric conversion devices arranged in an array, said light receiving device receiving the light beam from the light emitting device through the projector lens and the second and first prisms, said light beam from the light emitting device having been projected onto the screen through the first and second prisms and the projector lens and having been reflected by the screen;

focus detecting means for outputting an in-focus signal when only a predetermined photoelectric conversion device of the light receiving device produces an output; and controlling means for moving the projector lens along the optical axis by the lens driving circuit while rotating the first and second prisms by the first and second prism driving circuits, said controlling means calculating a position of a pixel of the liquid crystal panel corresponding to directions of the first and second prisms to supply the position of the pixel to the display circuit when the focus detecting means outputs the in-focus signal.

9. A projector according to claim 8, wherein the light beam from the light emitting device is used as a back light for the liquid crystal panel, said light beam being incident on the first prism after having passed through the liquid crystal panel.

* * * * *